Figure 4:
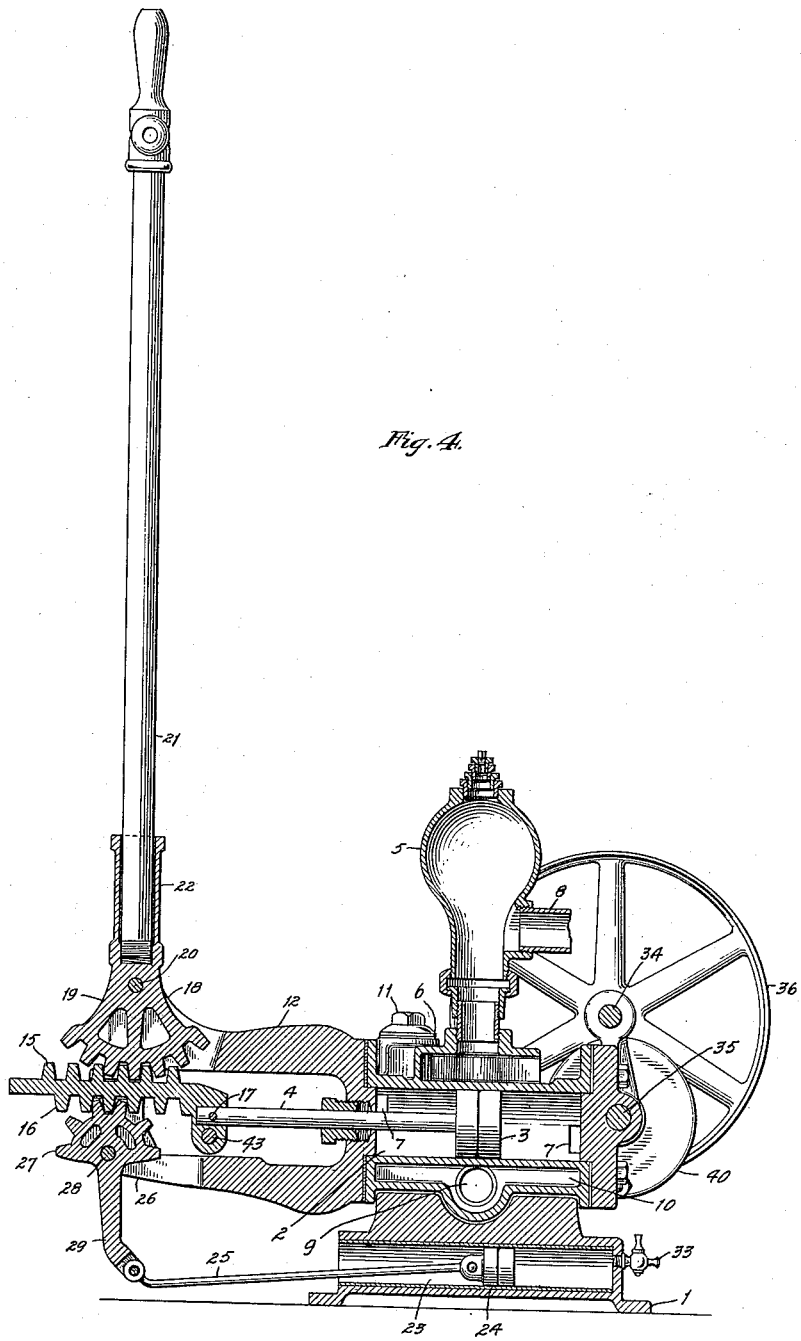

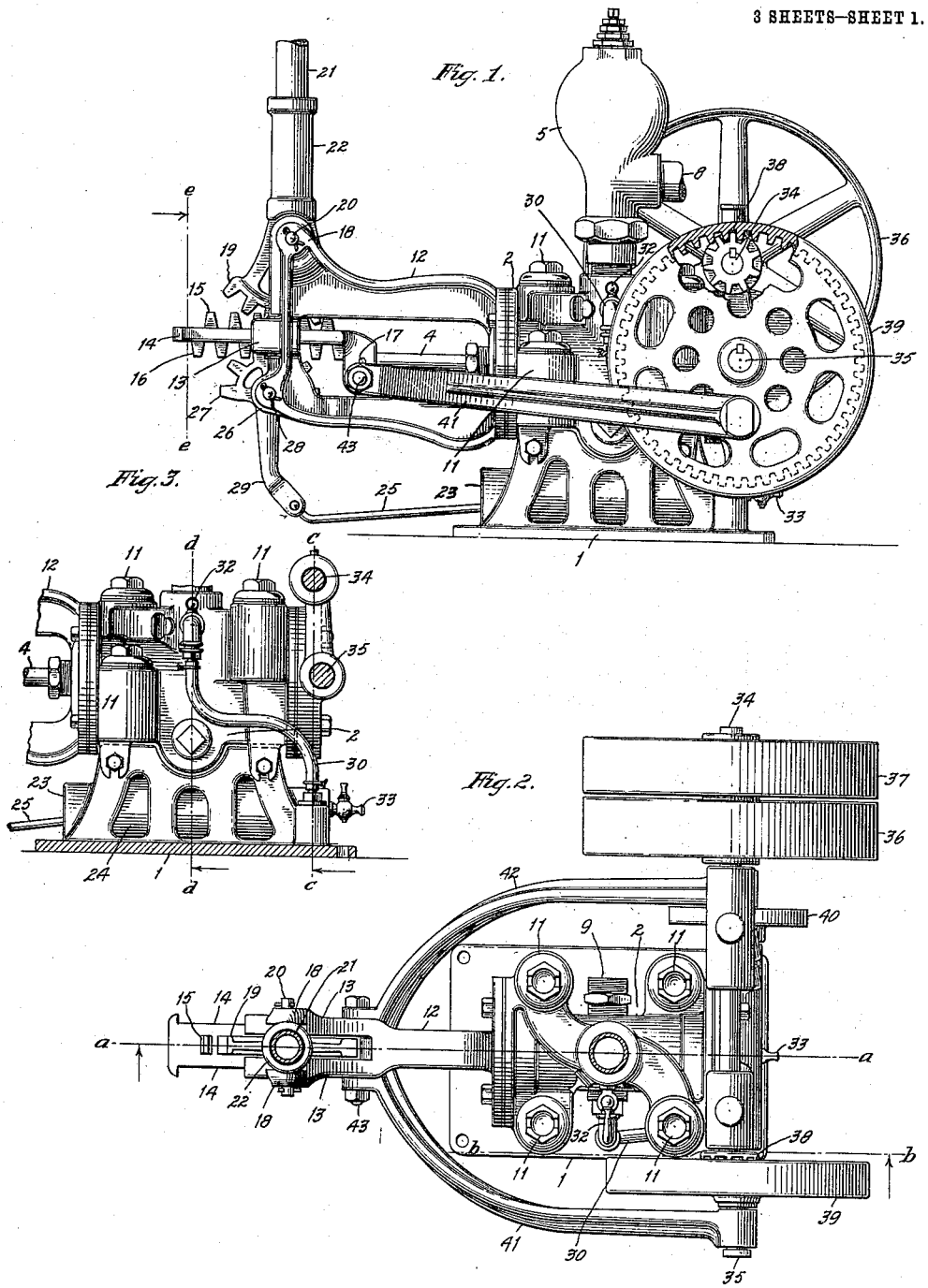

O. W. JOHNSON.
PUMP.
APPLICATION FILED MAR. 11, 1912.

1,043,319.

Patented Nov. 5, 1912.
3 SHEETS—SHEET 2.

Witnesses:
W. L. Dow
E. Behel.

Inventor:
Oscar W. Johnson
By A. O. Behel
Atty.

O. W. JOHNSON.
PUMP.
APPLICATION FILED MAR. 11, 1912.
1,043,319.
Patented Nov. 5, 1912.
3 SHEETS—SHEET 3.
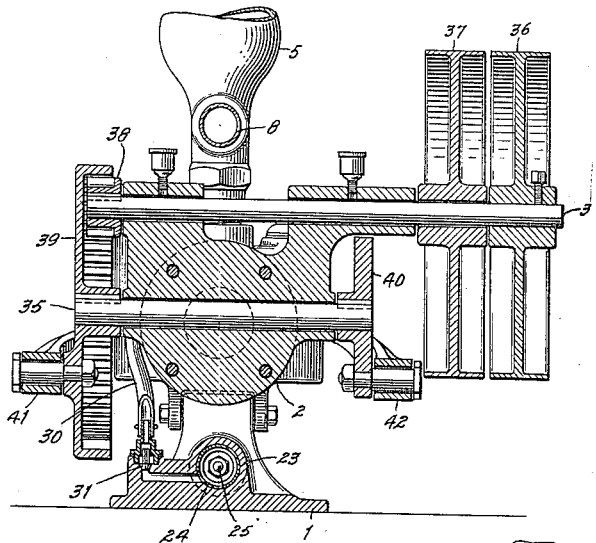
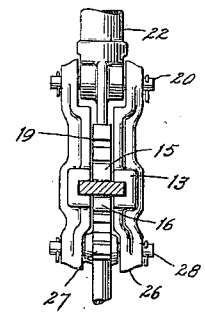
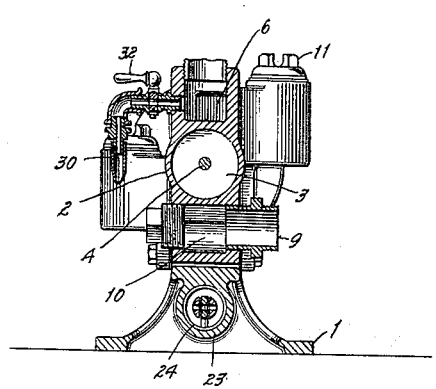

UNITED STATES PATENT OFFICE.

OSCAR W. JOHNSON, OF ROCKFORD, ILLINOIS, ASSIGNOR TO WARD PUMP COMPANY, OF ROCKFORD, ILLINOIS, A CORPORATION OF ILLINOIS.

PUMP.

1,043,319.      Specification of Letters Patent.      Patented Nov. 5, 1912.

Application filed March 11, 1912. Serial No. 683,072.

*To all whom it may concern:*

Be it known that I, OSCAR W. JOHNSON, a citizen of the United States, residing at Rockford, in the county of Winnebago and State of Illinois, have invented certain new and useful Improvements in Pumps, of which the following is a specification.

The object of this invention is to construct a pump comprising two cylinders, one for pumping water and the other for pumping air, and both having a common discharge, the piston of the air cylinder having a longer stroke than the water piston.

In the accompanying drawings, Figure 1 is a side elevation. Fig. 2 is a plan view. Fig. 3 is a section on line $b\ b$ Fig. 2. Fig. 4 is a section on line $a\ a$ Fig. 2. Fig. 5 is a section on line $c\ c$ Fig. 3. Fig. 6 is a section on line $d\ d$ Fig. 3. Fig. 7 is a section on line $e\ e$ Fig. 1.

The pump shown in the drawings in the main comprises the base 1 supporting a water cylinder 2 within which is located a piston 3 connected to a piston rod 4. An air chamber 5 communicates with the water chamber 6 communicating with the cylinder by the ports 7. A water discharge pipe 8 is located in the lower portion of the air chamber 5. A water inlet pipe 9 communicates with the water inlet chamber 10. The usual valves 11 are provided for the inlet and outlet passage-ways. A bracket 12 is connected to one end of the water cylinder and is formed with guide-ways 13 which receive and support the side-flanges 14 of the rack formed with two rows of teeth 15 and 16. The piston rod 4 has a connection with the rack by the pin 17. Ears are formed a part of the bracket 12, and toothed segment 19 is supported by these ears in a pivotal manner by the pin 20. A hand lever 21 is located in the socket portion 22 of the toothed segment 19. The toothed segment 19 engages the teeth 15 of the rack, and by oscillating the hand lever, the rack will be reciprocated, which will move the piston back and forth within the water cylinder, thereby pumping water and delivering it out of the discharge opening 8.

Beneath the water cylinder 2 is located an air cylinder 23 within which is located a piston 24 to which is connected a piston rod 25. Ears 26 are formed in connection with the bracket 12, and a toothed segment 27 is pivotally supported by the pin 28 in connection with the ears 26. This toothed segment 27 has an extension 29 to which is pivotally connected the piston rod 25 connected to the piston of the air cylinder. In operating the hand lever 21 the air piston will be operated in conjunction with the water piston, thereby pumping both air and water. From the air cylinder extends a pipe 30 communicating with the water discharge chamber 6. A check valve 31 Fig. 5, is located at the point of connection of the pipe 30 with the air cylinder and a stop cock 32 is located in the pipe 30 near its connection with the water chamber 6. A relief valve 33 is located in the closed end of the air cylinder.

When the air piston is reciprocated in the air cylinder air will be admitted around the cup packing of the piston and will be compressed within the cylinder and finally be discharged in the water contained in the water chamber 6, and pass with the water into the desired receptacle.

It will be noticed that the stroke of the air piston is considerable longer than the stroke of the water piston, this is the main object of this invention in order that a greater quantity of air can be discharged at each stroke of the air piston with respect to the quantity of water discharged by the water piston. As air will compress to a great extent it is necessary to increase the stroke of the air piston.

By opening the relief cock 33 no air will be pumped, this is useful when the air pressure is sufficient, but the quantity of water is not sufficient.

The base 1 supports two shafts 34 and 35, and tight and loose pulleys 36 and 37 are supported by the shaft 34. To the shaft 34 is fixedly connected a spur pinion 38 which meshes with an internal spur gear 39 secured to the shaft 35. A crank head 40 is secured to the shaft 35. Two connecting rods 41 and 42 are pivotally connected with the gear 39 and crank head 40 respectively, and the free ends of the connecting rods are pivotally connected to the rack by the bolt 43.

In rotating the shaft 34 by a belt connection with the tight pulley 37 the connecting rods will be moved, which in their connection with the rack will reciprocate the rack and also reciprocate the water and air pistons so that water and air may be pumped by power. In operating the pistons by hand, the connecting rods are disconnected with the rack by removing the bolt 43.

I claim as my invention.

1. The combination of a base, a water-cylinder supported thereby, an air-cylinder located below, parallel to said water-cylinder and supported by the base, pistons for the cylinders, a double-faced rack, a connection between the rack and water cylinder piston, a toothed-segment engaging one of said rack faces, a connection between the segment and air-cylinder piston, and means for reciprocating said rack.

2. The combination of a base, a water-cylinder and an air-cylinder supported thereby, pistons for the cylinders, a double-faced rack having a connection with the water-cylinder, a toothed-segment engaging said rack and having a connection with the air-cylinder, a drive-shaft supported by said frame, tight and loose pulleys supported by one end of the drive-shaft and a spur-pinion secured to the other end of the drive-shaft, an intermediate shaft supported by the frame, having a crank at one end and an internal-gear at the other end, adapted to mesh with said spur-pinion, pins secured to said crank and internal-gear, pitmen connecting the pins and rack, and means for rotating said drive shaft.

3. The combination of a base, a water-cylinder and an air-cylinder supported thereby, pistons for the cylinders, a drive-shaft supported by the frame, tight and loose pulleys supported by one end of the drive shaft and a spur-pinion secured to the other end of the drive-shaft, an intermediate shaft supported by the frame, having a crank at one end and an internal-gear at the other end, adapted to mesh with said spur-pinion, pins secured to said crank and internal-gear, pitmen having one end connected to said pins and the other ends adapted to drive said water and air pistons, and means for rotating said drive shaft.

In testimony whereof I have hereunto set my hand in presence of two subscribing witnesses.

OSCAR W. JOHNSON.

Witnesses:
A. O. BEHEL,
E. D. E. N. BEHEL.